UNITED STATES PATENT OFFICE.

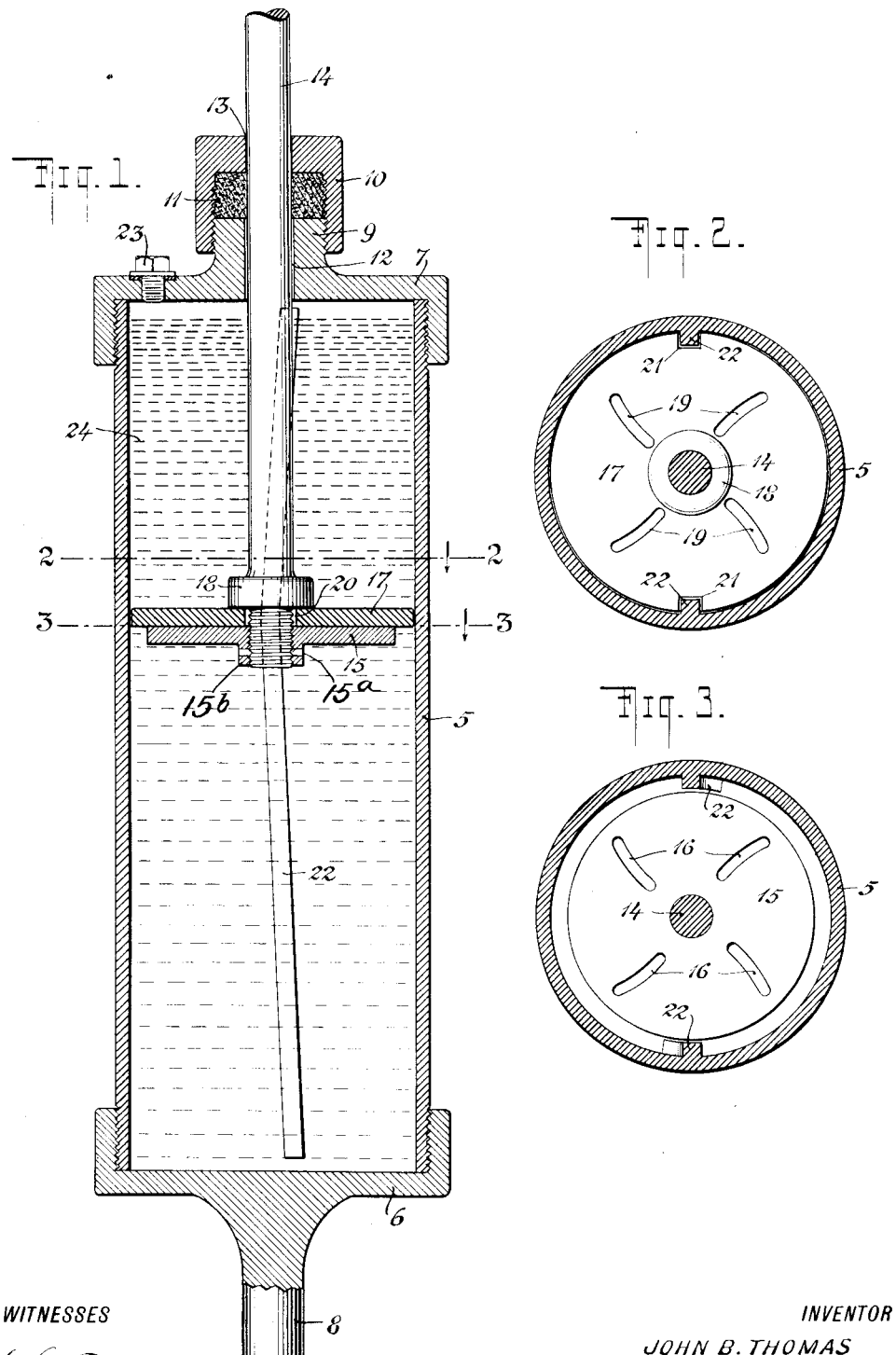

JOHN B. THOMAS, OF LAKEWOOD, NEW JERSEY.

SHOCK-ABSORBER.

1,078,885.  Specification of Letters Patent.  Patented Nov. 18, 1913.

Application filed August 9, 1912. Serial No. 714,147.

*To all whom it may concern:*

Be it known that I, JOHN B. THOMAS, citizen of the United States, resident of Lakewood, county of Ocean, State of New Jersey, have invented new and useful Improvements in Shock-Absorbers, of which the following is a specification.

My invention relates to shock absorbers adapted more particularly for use in connection with vehicles and has for its object to provide a device of this character which will offer a resistance proportionate to the severity of the shock and the subsequent recoil of the parts, thus making it possible to use comparatively light and sensitive springs on the vehicles to which my improvement is applied.

Other objects of my invention will appear from the description hereinafter and the features of novelty will be pointed out in the appended claims.

Reference is to be had to the accompanying drawings in which—

Figure 1 is a central longitudinal section of my improved shock absorber; Fig. 2 is a cross-section thereof on the line 2—2 of Fig. 1 and Fig. 3 is a similar view taken on the line 3—3 of Fig. 1.

In the drawings 5 represents a cylinder preferably screw-threaded at opposite ends to receive caps 6 and 7 for closing the same, the cap 6 being provided with a stem or rod 8 extending outwardly therefrom. This stem 8 may form an integral part of or be secured to said cap 6 and has its free end attached in any suitable manner either with the lower member of the usual vehicle spring or with the axle of the vehicle. The cap 7 is formed with an externally screw-threaded neck 9 adapted to receive a cap 10 in which a packing 11 of any suitable kind is contained to form a stuffing box. The neck 9 is provided with an axially extending aperture 12 which alines with a similar opening 13 in the cap 10 and through both of which a piston rod 14 extends, the packing 11 surrounding the same to prevent leakage in the usual manner. At its outer end the said piston rod 14 is connected in any suitable manner with the upper member of the usual vehicle spring or with the body of the vehicle as desired while at its lower end said piston rod carries a piston head 15 preferably having a diameter slightly less than the internal diameter of the cylinder 5. The piston head 15 is preferably detachably secured to said piston rod 14 and is rigidly held in position therein in any suitable manner, for instance by means of a pin 15ª passing through a collar 15ᵇ on said piston head and also through the piston rod 14, as shown in Fig. 1, said piston head being further provided with a series of radially extending apertures or ports 16 shown best in Fig. 3. A valve plate 17 is mounted on the upper face of the piston head 15 and is held in place against movement in an axial direction by means of an annular flange 18 which may be detachably fixed on the lower end of said piston rod 14, or form an integral part thereof or which may be in the nature of a removable nut, as desired. The valve plate 17 is provided with radial apertures or ports 19 corresponding to the slots 16 of the piston head 15 and adapted in the normal position of the part to register therewith, said valve plate being further formed with a central aperture 20 of slightly larger diameter than the diameter of the piston rod 14 and through which the said piston rod extends. The said valve plate 17 is thus rotatable about its own axis relatively to the piston head 15 between the flange 18 and the said piston head in the manner and for the purpose to be more fully described hereinafter. Any suitable or preferred arrangement of spiral grooves or ribs may be employed for turning the valve plate 17 relative to the piston head but in the form here shown at diametrically opposite points the valve plate 17 is provided with peripheral notches 21 into which guide ribs 22 located on and projecting inwardly from the inner surface of the cylinder 5 at preferably diametrically opposite points are adapted to extend. These guide ribs 22 as shown for example may be inclined relatively to a vertical plane passing through the axis of the cylinder or curved about axes extending across the axis of the cylinder and are adapted to exert a camming action on the valve plate 17 to cause the same to rotate about its own axis relatively to the piston head in one direction or another as the piston is moved downwardly or upwardly from a normal position. The guide ribs 22 at opposite sides of the cylinder are of course curved in opposite directions to secure the proper coöperation therebetween and those portions thereof which extend upwardly from the point representing the normal position of the piston have a curvature more pronounced than the portions of said guide ribs which extend downwardly from said normal point. By referring to Fig. 1 it will be seen that the guide ribs 22 extend throughout substantially the entire length of the cylinder from the top to the bottom thereof. A filling opening normally closed by means of a removable plug 23 is also provided in the cap 7 through which the oil or other suitable fluid 24 with which the cylinder is filled may be introduced.

When a vehicle is loaded and at rest or passing over a smooth surface the normal position of the piston head is as shown in Fig. 1 in which the relative positions of the piston head 15 and valve plate 17 are such that the ports 16 of the piston head are in substantially perfect registry with the ports 19 of the valve plate 17, or in other words, the said ports are open to the fullest extent. At this point with the parts in the described relative positions the oil or other fluid 24 may pass from one side of the piston head 15 to the other with the least resistance. If the piston head 15 should be forced downwardly from this normal position from any cause as for instance the effects of a shock, the valve plate 17 will be carried along and moved lengthwise of the guide ribs 22. Owing to the gradual curvature of these guide ribs 22 from the normal point downward, a camming action or pressure will be exerted thereby on the walls of the notches 21 and will consequently cause a gradual rotation of the valve plate 17 about the piston rod 14 and thus gradually move the ports 19 out of registry with the ports 16. The effect of this operation will be to reduce the open area of or gradually close said ports so that the resistance to the passage of the fluid 24 from beneath the piston head to the space above the same will gradually be increased and the flow of the said fluid from one side of the piston head to the other consequently retarded. A fluid cushion of continually increasing resistance will thus be produced the further downward the piston head moves in the cylinder, so that the effects of the shock will finally be entirely taken up and absorbed by my improved device without producing any effect on the other parts of the vehicle. When the said effects have been thus completely absorbed and the recoil or return of the parts to normal position begins, the resistance of the fluid above the piston head to this recoil or return movement at first is greatest owing to the relative positions of the valve plate and piston head and to the fact that the ports 16 and 19 are more or less closed. As the piston head rises in the cylinder the guides 22 will rotate the valve plate 17 in the opposite direction and will gradually return the ports 19 into registry with the ports 16, so that the resistance of the fluid to the recoil of the parts gradually becomes less until finally the normal position is again reached. The return of the parts is thus a gradual one and violent recoils with the consequent bad effects on the parts are absolutely done away with and obviated. In other words the above operation has the effect of producing a long, smooth wave instead of an abrupt shock as is the case in existing structures. Should the recoil be very severe and sufficient to force or thrust the piston head upwardly beyond the normal point then the upper portions of the guides 22 would immediately begin to rotate the valve plate in a direction to again move the ports out of registry with each other to close the same. Owing to the fact that the inclination or curvature of said upper portions of the guides 22 is more pronounced than that of the lower portions of said guides, the rotation of the valve plate will be relatively quicker and the ports will be more quickly closed than they are on the downward thrust of the piston head. A maximum of resistance to any abnormal upward recoil movement of the piston above the normal point is thus exerted by the fluid above the piston in a minimum of time, so that injury to the parts or to the vehicle from the effects of such severe recoils is entirely avoided.

It will thus be seen that my invention provides a shock absorber which may be applied to any kind of vehicle and which will absorb the slightest shocks as well as those of greater severity with equal efficiency. The very injurious effects of continually repeated slight shocks are thus entirely avoided as well as the effects of heavier shocks and much lighter and more sensitive springs may be used than at present. If the amount of fluid 24 in the cylinder 5 decreases from any cause as for instance evaporation or leakage, the same may be replenished from time to time through the opening in the cap 7 which is normally closed by the plug 23. While in the description I have mentioned two guides 22 and thus illustrated my improvement, it will be readily apparent that under some conditions one guide will be sufficient, while under other conditions three or more guides may be required to bring about the intended operations. By having two oppositely arranged guides as shown and described a pressure is exerted concurrently at two diametrically opposite points of the periphery of the valve plate and an angular pressure which might result, if only one guard is used, is avoided, so that the valve plate is easily and smoothly rotated in the described manner.

It is to be understood that when I speak of an upward or downward movement of the piston head in the cylinder I mean a movement of said piston head relatively to the cylinder in one direction or the other whether the piston head is actually moved from a given position or whether the cylinder is thus moved. In addition to this it is to be understood that while I intend to use my shock absorber primarily in connection with vehicles, the same may be used in any other connection and wherever possible, if desired, and obviously the angle at which the device is placed will not affect its action if properly connected up. Instead of having the guides 22 shaped as shown and described the same may be otherwise shaped to produce the same actuation of the valve plate as described.

Various changes in the specific form shown and described may be made within the scope of the claims without departing from the spirit of my invention.

I claim:

1. A shock absorber comprising a cylinder, a piston therein provided with ports, said cylinder and piston being arranged to reciprocate relatively to each other from a normal point, a valve plate rotatably mounted on said piston and having ports movable into and out of registry with the ports of said piston, said valve plate being further provided with a peripheral notch, a fluid in said cylinder adapted to flow through said ports from one side of said piston to the other, and an internal rib extending lengthwise of the cylinder and projecting into said peripheral notch, said rib having two portions of different sweep extending from said normal point whereby said valve plate is rotated at different speeds at opposite sides of said normal point as the piston and cylinder are reciprocated, whereby said ports are opened and closed and the resistance to the flow of the fluid from one side of the piston to the other is increased or diminished.

2. A shock absorber comprising a cylinder, a piston movable therein provided with radially extending curved slots, a valve plate rotatably mounted on said piston and having radially extending slots movable into and out of registry with the slots of said piston, said valve plate being further provided with diametrically opposite peripheral notches, a fluid in said cylinder adapted to flow through said slots from one side of said piston to the other and internal ribs extending lengthwise of said cylinder and projecting into said peripheral notches, said ribs each having two portions of different sweep extending from a given point whereby said valve plate is rotated at different speeds as the piston moves beyond said given point and the slots are opened and closed to increase or diminish the flow of the fluid from one side of the piston to the other.

In witness whereof I have hereunto set my hand in the presence of two subscribing witnesses.

JOHN B. THOMAS.

Witnesses:
   FRANK F. KIRKPATRICK,
   M. H. LOCKWOOD.